United States Patent [19]
Tamaru

[11] 4,156,251
[45] May 22, 1979

[54] COLOR TELEVISION RECEIVING APPARATUS

[75] Inventor: Hideshi Tamaru, Sagamihara, Japan

[73] Assignee: Sony Corporation, Tokyo, Japan

[21] Appl. No.: 825,186

[22] Filed: Aug. 16, 1977

[30] Foreign Application Priority Data

Aug. 19, 1976 [JP] Japan .................... 51/99027

[51] Int. Cl.² ............................................ H04N 9/62
[52] U.S. Cl. ................................... 358/10; 358/28
[58] Field of Search ....................... 358/10, 28, 40

[56] References Cited

U.S. PATENT DOCUMENTS

| | | | |
|---|---|---|---|
| 3,679,816 | 7/1972 | Avins | 358/28 |
| 3,780,218 | 12/1973 | Rennick | 358/28 |

Primary Examiner—Richard Murray
Attorney, Agent, or Firm—Lewis H. Eslinger; Alvin Sinderbrand

[57] ABSTRACT

In a color television receiving circuit, a color-demodulating subcarrier signal produced by an oscillator is applied through a first variable phase shifter and further through a second variable phase shifter to a color demodulator circuit. The subcarrier signal, after passing through only the first variable phase shifter, is applied to a second color demodulator circuit provided particularly for hue error detection. When a received composite color television signal includes a vertical interval reference (VIR) single, the detected output from the hue-error demodulator circuit is used to control the amount of phase shift of the first variable phase shifter, thereby automatically correcting the color hue. On the contrary, when the received signal does not include the VIR signal, the amount of phase shift of the first variable phase shifter is constant. The amount of phase shift of the second variable phase shifter can be changed by a common adjusting variable resistor irrespective of whether the VIR signal is present or not and hence the color hue can be preferentially adjusted.

4 Claims, 4 Drawing Figures

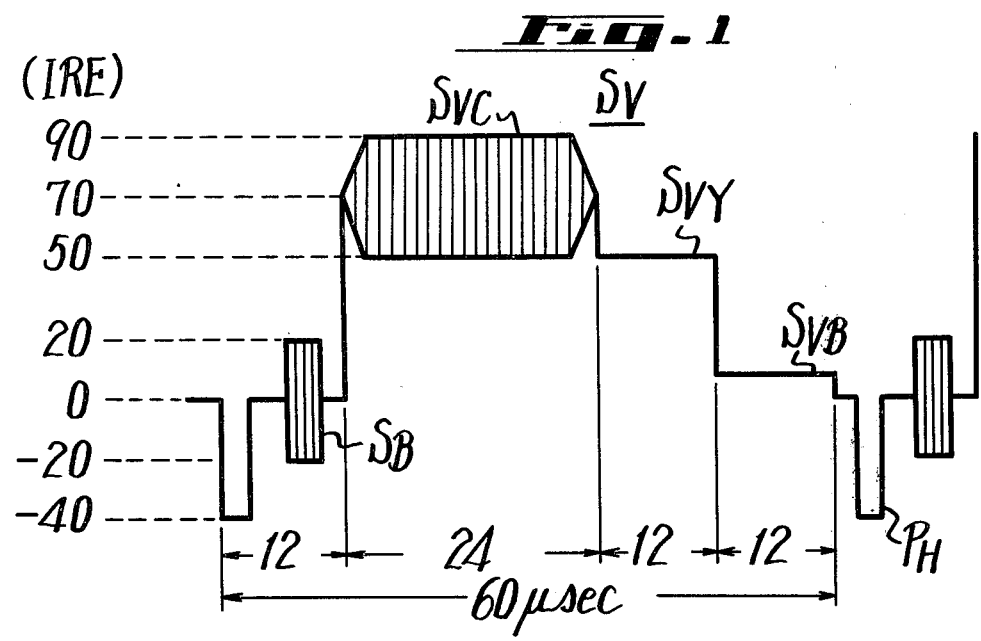
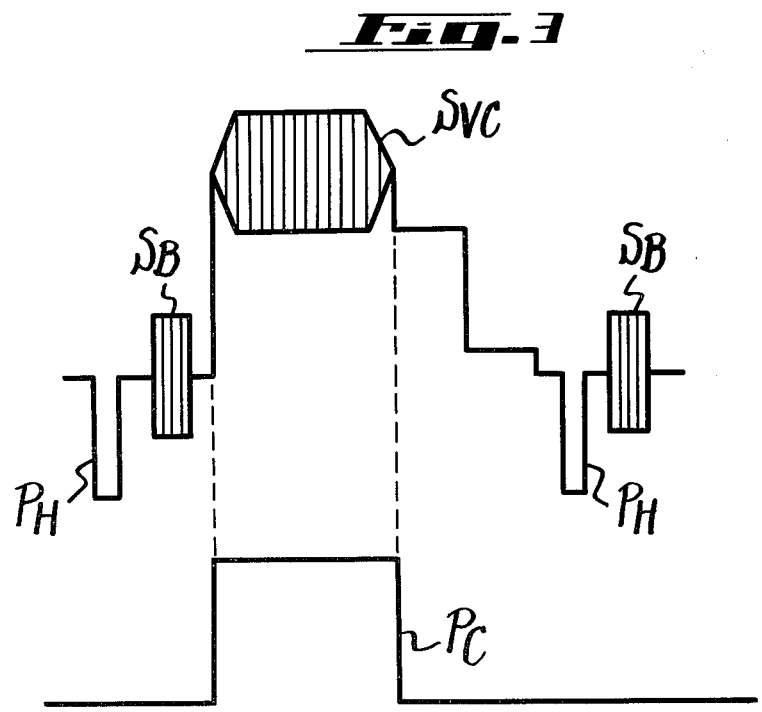

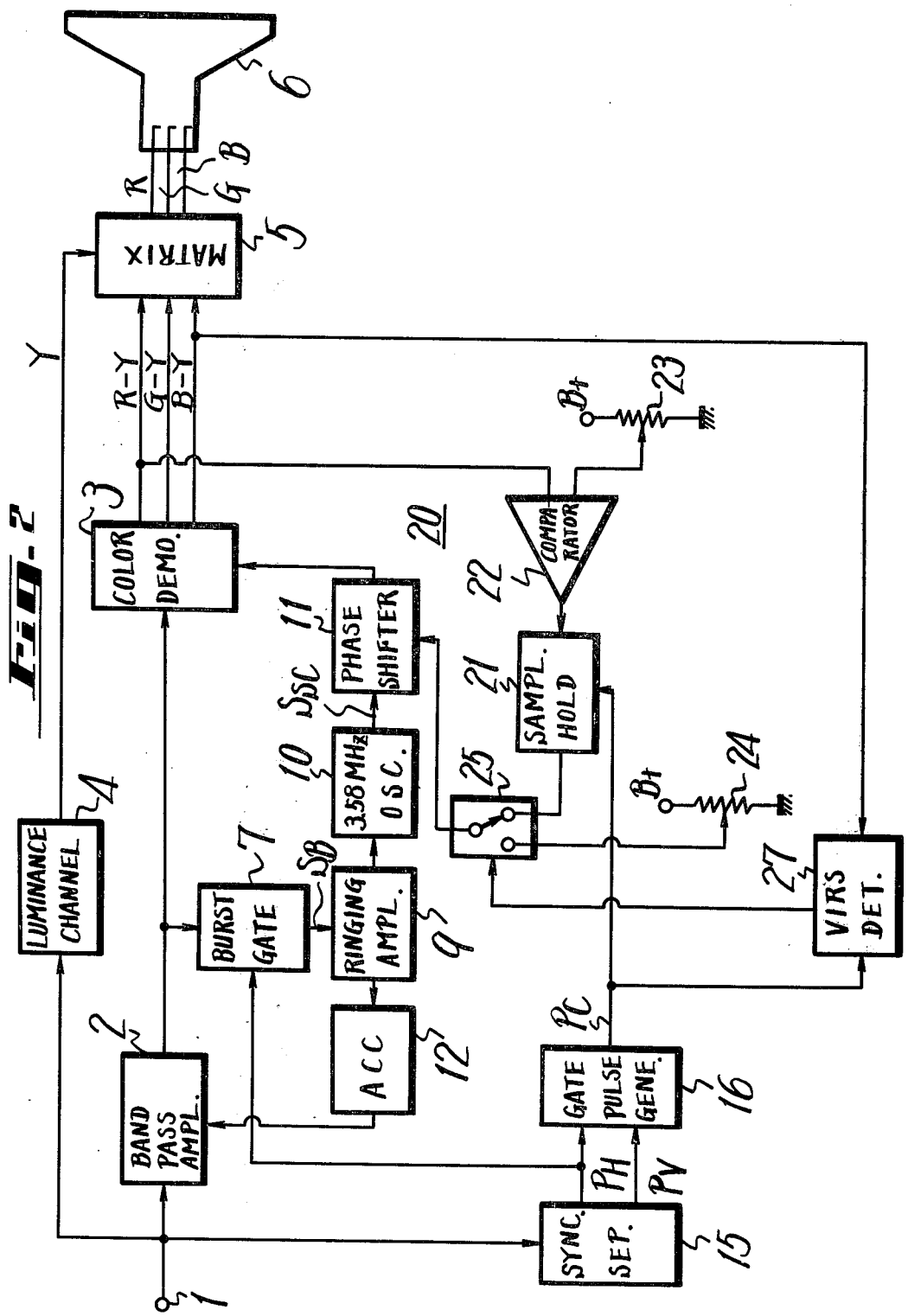

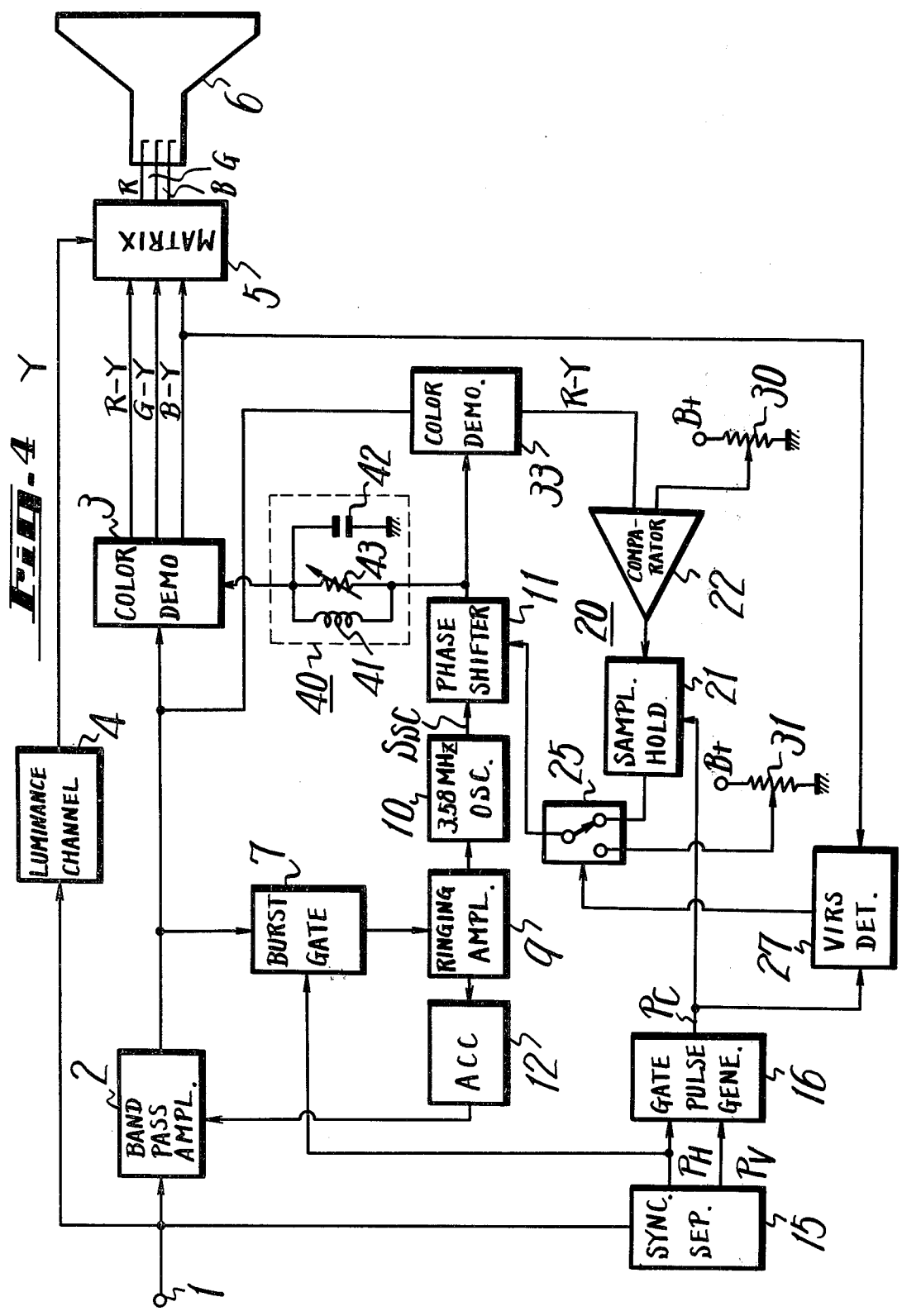

COLOR TELEVISION RECEIVING APPARATUS

BACKGROUND OF THE INVENTION

1. Field of the Invention

The present invention relates generally to a color television receiving apparatus, and particularly to a color television receiving apparatus in which color hue is automatically corrected by a vertical interval reference signal.

2. Description of the Prior Art

In conventional color television receivers, a color-demodulating subcarrier signal generated by a 3.58 MH$_z$ oscillator is applied through a variable phase shifter to a color demodulator circuit. If a received signal includes the so-called vertical interval reference (VIR) signal, the phase error of the VIR signal is detected by the demodulated output of the color demodulator circuit. The detected error output acts to control the amount of phase shift of the variable phase shifter, thus automatically correcting the hue. In this case, when the hue correction is made by the VIR signal, flesh tone is forced to be constant so that the color hue of reproduced picture can be corrected.

However, even when the color hue is properly reproduced, viewers often want to manually adjust or change the automatically corrected flesh hue to a flesh hue that is personally preferred by the particular viewer.

OBJECTS AND SUMMARY OF THE INVENTION

Accordingly, it is an object of the invention to provide a color television receiving apparatus in which the hue automatically corrected by the VIR signal can be adjusted in accordance with a viewer's preference and the preference adjustment can be made by using a single adjusting knob regardless of whether the VIR signal is present or not.

In accordance with an aspect of the invention, there is provided a color television signal receiving apparatus in which the color-demodulating subcarrier signal is applied through a first variable phase shifter and further through a second phase shifter to a color demodulator circuit. When the VIR signal is present in a received signal, the amount of phase shift of the first variable phase shifter is controlled in accordance with the phase shift of the VIR signal the chrominance component applied to the demodulator circuit relative to the burst signal therein, and conversely in the absence of the VIR signal the amount of phase shift of the first phase shifter is fixed to be constant. On the other hand, the amount of phase shift of the second variable phase shifter can be changed by a single control knob regardless of whether the VIR signal is present or absent.

The above, and other objects, features and advantages of the invention, will be apparent in the following detailed description of an illustrative preferred embodiment of the invention which is to be read in connection with the accompanying drawings.

BRIEF DESCRIPTION OF THE DRAWINGS

FIG. 1 is a waveform diagram showing one example of the VIR signal;

FIG. 2 is a block diagram of a conventional color television receiver in which hue is automatically corrected by the VIR signal in accordance with the prior art;

FIG. 3 is a waveform diagram to which reference is made in explaining the operation of the receiver shown on FIG. 2; and FIG. 4 is a block diagram showing one embodiment of the color television signal receiving apparatus according to the invention.

DETAILED DESCRIPTION OF PREFERRED EMBODIMENT

Referring to FIG. 1, there is shown a waveform of a video detected output signal in the 19th horizontal interval (within the vertical retrace interval) of each vertical period, in which $P_H$ represents a horizontal synchronizing signal, $S_B$ a burst signal and $S_V$ a VIR signal, as a whole. The VIR signal $S_v$ consists of a chrominance reference signal $S_{VC}$, a luminance reference signal $S_{VY}$ and a black reference signal $S_{VB}$ in sequence. Assuming that the pedestal level is expressed by 0 IRE (luminance level) and the maximum white level by 100 IRE, the peak-to-peak value of the burst signal $S_B$ is selected as 40 IRE.

The chrominance reference signal $S_{VC}$ is a simusoidal wave signal of 3.58 MH$_z$ similar to the burst signal $S_B$ and also has the same amplitude and phase as does the burst signal $S_B$. This chrominance reference signal $S_{VC}$ is superimposed upon the luminance level of the average flesh tone which is 70 IRE. The level of the luminance reference signal $S_{VY}$ is selected to be 50 IRE, and that of the black reference signal $S_{VB}$ is selected to be 7.5 IRE.

When the average flesh tone undergoes phase distortion, the chrominance reference signal $S_{VC}$ also suffers a similar phase distortion. Therefore, the phase shift of the chrominance reference signal $S_{VC}$ with respect to the burst signal $S_B$ corresponds to the phase distortion of the average flesh tone. Accordingly, by controlling the demodulation axis in the color demodulator circuit in accordance with this pahse shift, it is possible to correct the hue aberration of the flesh tone caused by the phase distortion. In addition, if the amplitude of the chrominance reference signal SVC, corresponding to that of the average flesh tone, is controlled to be constant, the color saturation level can be fixed to a certain value with the flesh tone as its center.

Referring now to FIG. 2, there is shown a conventional color television receiver having a correction circuit using such a VIR signal. In this prior art receiver, an antenna, not shown, receives a composite color television signal including horizontal and vertical synchronizing signals, a color burst signal, a luminance signal and a chrominance signal. This composite color television signal received by the antenna may be further of the previously described type having an additional VIR signal that is provided at a predetermined line interval during the vertical retrace interval, and which includes a chrominance reference signal as described above.

At the terminal 1 on FIG. 2 is applied a color video signal that is produced in a video detector circuit (not shown), and this color video signal is fed to a band pass amplifier 2 from which is derived a chrominance signal for application to a color demodulator circuit 3.

The chrominance signal is further applied to a burst gate circuit 7 from which the color burst signal $S_B$ is derived. The color burst signal $S_B$ is fed through a ringing amplifier 9 to an oscillator 10 where a continuous sub-carrier signal $S_{SC}$ of 3.58 MH$_z$ is produced. The sub-carrier signal $S_{SC}$ is applied through a variable phase shifter 11 to color demodulator circuit 3.

The color demodulator circuit 3 thus produces, for example, three color difference signals R-Y, G-Y and B-Y, which are then applied to a matrix circuit 5 together with a luminance signal Y obtained through a luminance channel 4 which is supplied with the color video signal from terminal 1. The matrix circuit 5 conventionally produces color component signals R, G and B of red, green and blue, respectively, which are then delivered to a color cathode ray tube 6.

Further, in the known circuit of FIG. 2, an automatic chrominance control (ACC) circuit 12 is supplied with the signal from the ringing amplifier 9 and provides an output to band pass amplifier 2 to control the gain of the latter, and a synchronizing signal separator circuit 15 is supplied with the color video signal from terminal 1 and separates therefrom the horizontal synchronizing signal $P_H$ and a vertical synchronizing signal $P_v$. The horizontal synchronizing signal $P_H$ is fed to burst gate circuit 7, and the horizontal and vertical synchronizing signals $P_H$ and $P_V$ are fed to a gate pulse generator circuit 16 to produce therefrom a gate pulse $P_C$ for gating the interval of the chrominance reference signal $S_{VC}$ in the 19th horizontal period during each vertical interval as illustrated in FIG. 3.

A color correction circuit using the chrominance reference signal $S_{VC}$ is indicaled generally at 20. In order to correct color hue, it is necessary to detect the phase shift of the chrominance reference signal $S_{VC}$ with respect to the burst signal $S_B$ and to correct the demodulation axis in the demodulator circuit 3 in accordance with the detected phase shift. This phase shift corresponds to the output level of the chrominance reference signal $S_{VC}$ in the demodulated output R-Y obtained from the color demodulator circuit 3. Therefore, the demodulated output R-Y is supplied through a comparator circuit 22 to a sampling hold circuit 21 where only the interval of the chrominance reference signal $S_{VC}$ of the demodulated output R-Y is sampled by the gate pulse $P_C$ derived from gate pulse generator circuit 16, whereupon, the sampled value is held. The output of the sampling hold circuit 21 is applied through a switching circuit 25 to variable phase shifter 11 to control the amount of phase shift in phase shifter 11. This causes the demodulation axis in color demodulator circuit 3 to be corrected, thereby achieving the automatic correction of color hue.

The comparator circuit 22 is provided because, when the chrominance reference signal $S_{VC}$ is in phase with the burst signal $S_B$ and the red color difference signal is zero, the demodulated output R-Y is not zero volts, but rather has a predetermined DC level. Hence, comparator 22 subtracts such predetermined DC" level from the demodulated output R-Y and applies the resulting difference to sampling hold circuit 21. This DC level is determined by a semifixed resistor 23 connected to comparator circuit 22.

In order to correct the color saturation level, it is necessary to detect the amplitude of the chrominance reference signal $S_{VC}$ and, on the basis thereof, to correct the level of the chrominance signal to be applied to color demodulator circuit 3, but such correction of color saturation level is not illustrated.

When a composite color television signal without VIR signal $S_V$ is received, the known circuit is automatically switched to avoid the automatic correction and, in this case, a manual adjustment color hue can be effected.

More particularly, a variable resistor 24 is provided for the adjustment, the voltage therefrom being applied to switching circuit 25. A VIR signal detector circuit 27 is supplied with the modulated output B-Y from color demodulator 3 and detects the presence or absence of the chrominance reference signal $S_{VC}$ at the time of gate pulse $P_C$ applied from gate pulse generator 16 to detector 27. The output of the detector circuit 27 is used as a switching signal for the switching circuit 25. More particularly, as described above, in the presence of VIR signal $S_V$, the switching circuit 25 is in the illustrated condition, but in the absence of VIR signal $S_V$ it is changed over to the side of variable resistor 24. Thus, in the absence of VIR signal $S_V$, the amount of phase shift in the variable phase shifter circuit 11 can be changed by adjusting the variable resistor 24 externally, thereby enabling the color hue to be freely adjusted in accordance with viewer's preference.

In order that this receiver have the ability to change, according to the viewer's preference, the color hue which is automatically corrected by VIR signal $S_V$, it is necessary that the resistor 23 is not semifixed but can be externally adjusted. If the reference level obtained from resistor 23 is changed, the output level of comparator circuit 22 varies despite an unchanged level of demodulated output R-Y, thus altering the amount of phase shift in variable phase shifter 11. Consequently, viewers are able to achieve a preferred adjustment of color hue.

However, this results in the fact that the receiver must be provided on its panel with two knobs for the preference adjustment in the cases of presence and absence of VIR, respectively, and hence viewers have to select one of the knobs for adjustment in each case. Therefore, the adjustment becomes complicated and is apt to be erroneous if the viewer adjusts the wrong knob.

FIG. 4 shows one example of the color television receiving apparatus according to the invention, in which the elements which correspond to those described with reference to FIG. 2 are identified by the same reference numerals.

In the example of FIG. 4, resistors 30 and 31, which correspond to resistors 23 and 24, respectively, of the prior art arrangement of FIG. 2, are semifixed for obtaining reference levels that can not be adjusted externally or by the viewer. In this case, the variable phase shifter circuit 11 serves as a first variable phase shifter, the subcarrier from which is applied through a second variable phase shifter 40 to color demodulator circuit 3. This second variable phase shifter 40 consists of an inductance element 41 interposed in the transmission path, a capacitor 42 connected in parallel therewith and an adjusting variable resistor 43 connected in parallel with the inductance element 41. By adjusting the variable resistor 43, the effective inductance of pahse shifter 40 is varied, thereby altering the amount of phase shift thereof. On the panel of the receiver is mounted an adjusting knob (not shown ) for the variable resistor 43.

In addition to color demodulator circuit 3, there is provided another color demodulator circuit 33, which is supplied with the chrominance signal from band pass amplifier 2 and the subcarrier that is derived from first variable phase shifter 11 and which thus produces the demodulated output R-Y of red color difference signal. The comparator circuit 22 is supplied with the demodulated output R-Y of the color demodulator circuit 33, but not of the color demodulator circuit 3.

In the color television signal receiving apparatus according to the invention with the construction described above, the single adjusting knob provided for adjusting variable resistor 43 enables the preference adjustment of color hue in the presence or absence of VIR signal $S_V$. More particularly, upon the reception of a composite color television signal without VIR signal $S_V$, though the amount of phase shift in the first variable phase shifter 11 is unchanged, the amount of phase shift by the second variable phase shifter 40 can be changed by adjusting variable resistor 43, thereby permitting control of the phase of the subcarrier supplied to color demodulator circuit 3. As a consequence, viewers can freely change the color hue in accordance with their preference. On the other hand, on the reception of a composite color television signal with VIR signal $S_V$, the amount of phase shift in the first variable phase shifter 11 is controlled in accordance with the phase shift of the chrominance reference signal $S_{VC}$ with respect to the burst signal, this phase shift being detected on the basis of the demodulated output R-Y of color demodulator circuit 33, thereby automatically correcting the color hue. Also, since the amount of phase shift in the second variable phase shifter 40 can be changed by adjusting variable resistor 43, the automatically corrected color hue can be further altered in accordance with the viewer's preference.

If, in the receiver shown in FIG. 4, the detection of the phase shift of the chrominance reference signal $S_{VC}$ with respect to the burst signal $S_B$ was achieved in the manner shown on FIG. 2, that is, by utilizing the demodulated output R-Y of color demodulator circuit 3, rather than the demodulated output R-Y of additional color demodulator circuit 33, the second variable phase shifter 40 would result of a existence in the closed loop for the automatic correction by the chrominance reference signal $S_{VC}$. In that case, the phase shift for the preference adjustment in the second variable phase shifter 40 would be detected as a phase shift of the chrominance reference signal $S_{VC}$ with respect to the burst signal $S_B$, and the amount of phase shift by variable phase shifter 11 would be controlled to cancel out the phase shift for the above-mentioned preference adjustment. As a result, the preference adjustment could not be performed in the absence of the additional color demodulator circuit 33 provided in the circuit according to the invention.

Although a single preferred embodiment of the invention, has been described above but it will be apparent that many modifications and variations could be effected therein by one skilled in the art without departing from the spirit or scope of the invention as defined in the appended claims.

What is claimed is:

1. In a color television receiver for receiving a composite color television signal comprised of horizontal and vertical synchronizing signals, a color burst signal, a luminance signal and a chrominance signal, which composite color television signal is of the type that may additionally have a VIR signal provided in a predetermined line during a vertical retrace interval and including a chrominance reference signal; the combination of a color demodulator receiving said chrominance signal, means including an oscillator controlled in accordance with said color burst signal for providing a subcarrier signal, first variable phase shifter means receiving said subcarrier signal, means operative when the received composite color television signal includes said VIR signal to control the amount of phase shift of said subcarrier signal by said first phase shifter means in accordance with the phase deviation of said chrominance reference signal in respect to said color burst signal in the received composite color television signal, means for establishing a predetermined constant amount of phase shift in said first variable phase shifter means when said VIR signal is absent from the received composite color television signal, and second variable phase shifter means through which said subcarrier signal is applied from said first variable phase shifter means to said color demodulator for effecting color demodulation of said chrominance signal in said color demodulator, said second variable phase shifter means including a manually adjustable resistor by which the amount of phase shift of the subcarrier signal by said second variable phase shifter means is varied for selecting a desired color hue both when said VIR signal is present in, and absent from the received composite color television signal.

2. A color television receiver according to claim 1; in which said means operative to control the amount of phase shift by said first phase shifter means includes a second color demodulator receiving said chrominance signal in advance of the first mentioned color demodulator and further receiving said subcarrier signal directly from said first variable phase shifter means for providing a demodulated output, comparator means for comparing said demodulated output with an adjustably fixed reference level and providing a corresponding comparison output, sample and hold means to sample and hold the value of said comparison output in said predetermined line of each vertical retrace interval and means for applying the sampled and held value from said sample and hold means to said first variable phase shifter means as a control signal for the latter when said VIR signal is present in the received composite color television signal.

3. A color television receiver according to claim 2; in which said first variable phase shifter means has a control input for determining said amount of phase shift in dependence on the voltage level applied thereto; said means for applying the sampled and held value as a control signal includes switch means responsive to the presence and absence of said VIR signal in the received composite color television signal to apply said sampled and held value to said control input only when said VIR signal is present; and said means for establishing a predetermined constant amount of phase shift in said first variable phase shifter means includes means for establishing an adjustably fixed voltage level which is applied to said control input through said switch means when said VIR signal is absent from the received composite color television receiver.

4. A color television receiver according to claim 2; in which said second variable phase shifter means further includes an inductance element connected in parallel with said adjustable resistor in the transmission path of subcarrier signal from said first variable phase shifter means to the first mentioned color modulator, and a capacitor connected to ground from a junction between said inductance element and adjustable resistor at the side thereof directed toward said first color demodulator.

* * * * *